United States Patent
Connery et al.

(10) Patent No.: US 6,606,709 B1
(45) Date of Patent: *Aug. 12, 2003

(54) SECURE SYSTEM FOR REMOTE MANAGEMENT AND WAKE-UP COMMANDS

(75) Inventors: Glenn W. Connery, Sunnyvale, CA (US); Danny M. Nessett, Fremont, CA (US)

(73) Assignee: 3Com Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/075,103

(22) Filed: Oct. 29, 2001

Related U.S. Application Data

(63) Continuation of application No. 09/139,625, filed on Aug. 25, 1998, now Pat. No. 6,311,276.

(51) Int. Cl.[7] ................................................. G06F 11/30
(52) U.S. Cl. ....................................................... 713/201
(58) Field of Search ............................... 713/200, 201, 713/202; 709/229

(56) References Cited

U.S. PATENT DOCUMENTS

| | | | | |
|---|---|---|---|---|
| 5,305,321 A | * | 4/1994 | Crayford | 370/99 |
| 5,428,745 A | * | 6/1995 | De Bruijn et al. | 395/200 |
| 5,485,622 A | * | 1/1996 | Yamaki | 713/200 |
| 5,826,015 A | * | 10/1998 | Schmidt | 713/201 |
| 6,311,276 B1 | * | 10/2001 | Connery et al. | 713/201 |

OTHER PUBLICATIONS

"Magic Packet Technology—White Paper" Advance Micro Devices, Inc., issued Nov. 1995.
"MDS Message–Digest Algorithm", Computer Data Authentication, RFC1321, Rivest, Apr. 1992 or DES–MAC, Also call DAA, [Fips–113].

* cited by examiner

Primary Examiner—James P. Trammell
Assistant Examiner—Pierre E. Elisca
(74) Attorney, Agent, or Firm—McDonnell Boehnen Hulbert & Berghoff

(57) ABSTRACT

A security feature is added to the Wake On LAN packet protocol, and an extensible mechanism is provided allowing for other commands and options to be specified within the Wake On LAN packet. The protocol allows for signaling power management circuits in a host computer in response to messages received through a network interface. Logic coupled to the network interface detects a received network packet carrying a message from a source to the management circuits in the host computer. The logic includes security logic that is responsive to data in the packet to authenticate the source of the message, to accept the message and generate a signal to the management circuit in the host computer when the message passes authentication, and to discard the message when the message fails authentication. The message includes a message authentication code timestamp indicating a time at which the source produced the message and/or a random value token The security logic includes resources to verify the message authentication code and to prevent re-use of the message.

47 Claims, 5 Drawing Sheets

SECURE SYSTEM FOR REMOTE MANAGEMENT AND WAKE-UP COMMANDS

This application is continuation of Ser. No. 09/139,625, Aug. 25, 1998, U.S. Pat. No. 6,311,276.

BACKGROUND OF THE INVENTION

1. Field of the Invention

The present invention relates to the management of computer networks in which end stations in the network have the power management circuitry; and more particularly to techniques for securely issuing commands across the network to such end stations to wake-up or execute other system and power management functions.

2. Description of Related Art

Management of computer networks is accomplished in many systems by a central network management station which has access to end stations in the network for management functions. However, in complex network environments, many of the end stations are turned off at night or at other times when they are not in use, either manually or automatically by power management circuits. This prevents the network management station from gaining access to the end station, limiting the ability to effectively manage the network. Thus, technology has evolved which allows a remote network management station to wake-up an end station in the network to allow it to perform network management processes, or otherwise communicate with the end station. Such technology is referred to generally as Wake On LAN herein. The Wake On LAN feature of network adapter cards in personal computers allows network administrators to remotely boot powered offend systems. One popular technology for implementing the Wake On LAN feature is referred to as the "Magic Packet" technology, developed by Advanced Micro Devices, Inc. See "Magic Packet Technology—White Paper" Advanced Micro Devices, Inc., issued November 1995. One concern that the Wake On LAN feature creates is the potential for intruders acting remotely to power-up unattended systems, and attempt to penetrate them. This danger is more acute than that for already powered up systems, from one point of view, because their powered down state can be used as evidence that they are not being monitored for intrusion. Thus, Wake On LAN protocols present an avenue for hackers to gain access through a network to sleeping devices.

The "Magic Packet" technology developed by AMD involves transmission of a special packet which is identified by 16 duplications of the. MAC address of the end station to be woken up without breaks or interruptions, inside a single packet. The network interface card is adapted to recognize this special packet, and signal the host system that it has received a Wake On LAN command.

One approach to providing security for the Wake On LAN feature involves transmitting a separate packet carrying a password. Before the network interface card issues a command to the host system, it must receive both the special Wake On LAN packet and the special password packet. This approach has a number of drawbacks, including the fact that packets can be snooped by other stations in the network, allowing the password to be learned by other parties. Also, the Wake On LAN packet sequence can be easily replayed by parties attempting to enter the system. In addition, the requirement of two packets requires complicated circuitry in the network interface card, increasing costs. Thus, the password packet approach provides limited security at increased costs.

It is desirable to provide a secure Wake On LAN system, and otherwise extend the Wake On LAN protocol for greater flexibility and functionality.

SUMMARY OF THE INVENTION

The present invention provides secure wake up or power management message protocol, such as by adding a security feature to the Wake On LAN packet itself or by providing an alternative secure manage protocol for this function. Other aspects of the invention provide an extensible mechanism allowing for other commands and options to be specified within the secure message packet, such as remote power down, remote reset, remote diagnostics, wake-up into boot ROM bypassing password prompts, or other system management and power management commands.

Thus an apparatus for signaling management circuits in a host computer in response to messages received through a network interface is provided. The apparatus includes logic that is coupled to the network interface to detect a received network packet carrying a message from a source to the management circuits in the host computer. The logic includes security logic that is responsive to data in the packet to authenticate the source of the message, to accept the message and generate a signal to the management circuits in the host computer when the message passes authentication, and to discard the message when the message fails authentication.

According to one embodiment, the message includes a message authentication code. The security logic includes resources to verify the message authentication code. The message authentication code in various embodiments comprises a message digest taken over the message and a secret value known to the source of the message and to the security logic in the network interface. For example, one message authentication code comprises the results of a hash function over the message and the secret value.

The message also includes a token used to prevent reuse of the same packet by an intruder. In one embodiment, the token includes a timestamp indicating a time at which the source produced the message, and the security logic includes resources to verify that the timestamp falls within a security window of time.

According to another embodiment, the information to indicate reuse of the message, comprises a random value token which can be truly random or pseudo-random. The security logic includes resources to detect re-use of the message by comparing the random value token to random value tokens used previously. Thus, in this embodiment the security logic includes logic to determine whether another message has been received having the same token. Such logic includes memory for storing random values from previous messages to be compared with the random value of a current message.

The timestamp and/or random value token can be used to detect reuse according to a variety of algorithms. According to one algorithm, the logic that detects reuse ensures that the timestamp in a message being authenticated is more recent than a last received and authenticated message. Thus, the timestamp of any valid packet must be more recent than the timestamp of any other packet that had been received.

According to another approach, resources detect reuse by storing timestamps of received messages and comparing the stored timestamps with the timestamp of a message being authenticated to verify that the timestamp of the message being authenticated is more recent than a baseline time and does not match the timestamp of a received message in the memory. The baseline time is equal to the most recent of the current time as measured for the security logic at the host computer and a time represented by an earliest timestamp in the memory. According to one embodiment of this algorithm, the network adaptor which detects a message that has a valid authentication code but also a timestamp matching a timestamp in the memory issues a signal to the source of the message indicating a collision. This allows the source of the message to reissue a new message with an updated timestamp.

According to another approach, the token comprises a timestamp and a random or pseudo-random value. In this embodiment, the message must be authenticated, carry a timestamp more recent than a baseline time, and carry a value which does not match both a timestamp and a random or pseudo-random value of a received message already in the memory.

According to one aspect of the invention, the message comprises one of a set of messages concerning host system or power management, the set of messages including at least one member for signaling the management circuits to boot the host computer, a member for signaling the management circuits to wake the host computer from a sleeping state, a signal carrying commands for diagnostic processes, a signaling for causing reset of the host computer, and a signal which provides booting the host system while bypassing the boot password requirements in the boot memory.

According to other embodiments of the invention, an apparatus is provided for connecting a host computer having power management circuits to a network. According to this embodiment the system includes a medium access control unit for connection to a network, a host interface for communication of received network packets to the host computer, and logic coupled to the medium access control unit to detect received network packets carrying a message from a source to the power management circuits in the host computer. In this embodiment, the messages include a message authentication code and one or more of a timestamp, and a random value token, and the system includes security logic to verify the authenticity of the messages as discussed above. The medium access control unit in a preferred embodiment comprises an Ethernet MAC unit having a MAC address, and the medium access control unit is adapted to receive packets having a destination address within a set, of one or more destination addresses, when the host system is powered down or otherwise in a state of limited function due to power management processes. The set of destination addresses preferably includes the MAC address of the medium access control unit and/or a multi-destination MAC address.

According to yet another aspect, the present invention provides a method for signaling management circuits in an end station from a management station through a network. The method comprises establishing a protocol for transmitting management messages including authentication with the end station, producing the management message according to the protocol, and transmitting the management message to the end station. In one embodiment, the protocol includes sharing a secret value with the end station, and the message includes a message authentication code produced according to the secret value. A token is included in the messages, in various combinations, such as a random value token and/or a timestamp, used to prevent reuse of the message.

Accordingly, the present invention provides an improvement over the Wake On LAN protocol, providing for enhanced security and flexibility in systems that allow a remote station to issue wake-up commands to an end station in the network. The improved security is combined with greater flexibility associated with providing a command set that extends the Wake On. LAN concept to a variety of management processes. Thus, network usability, flexibility and security are enhanced.

Other aspects and advantages of the present invention can be seen upon review of the figures, the detailed description, and the claims which follow.

DETAILED DESCRIPTION

Figure 1:
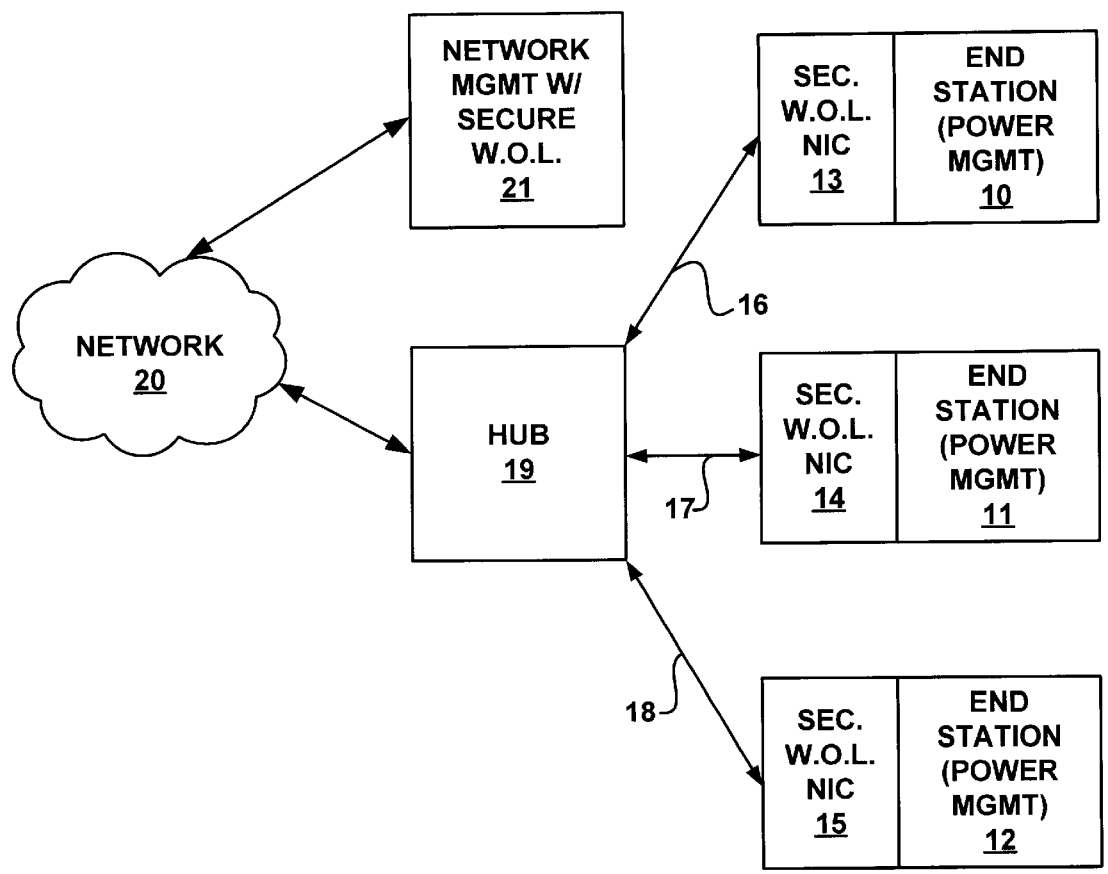
FIG. 1 provides a simplified diagram of a computer network having secure Wake On LAN features according to the present invention.

A detailed description of embodiments of the present invention is provided with reference to the figures, in which FIG. 1 illustrates a context in which the present invention is applied. In FIG. 1, a plurality of end stations, in including end station 10, end station 11, and end station 12 are illustrated. Each of the end stations includes system and power management circuitry, as well as a secure Wake On LAN network interface card, including cards 13, 14, and 15 respectively. The network interface cards 13, 14, 15 provide for connection to network media, 16, 17, 18 respectively. The network media 16, 17, 18 are coupled to a hub 19. The hub may be implemented using a repeater, a switch, a bridge, a router, or any of a variety of network intermediate devices which allow for interconnection of the end stations 10, 11, 12 into a physical or virtual local area network.

The hub 19 is coupled to a broader network represented by the cloud 20. The broader network 20 may comprise the Internet and private intra-company networks in various combinations. Coupled to the network 20 in this example, a network management station 21 is shown. The network management station 21 according to the present invention supports the secure Wake On LAN protocol. Of course, the network management function may be executed by any computer in the network 20, including the local area network served by hub 19.

Network management functions which are executed using the secure Wake On LAN feature of the present invention include waking up powered down end stations to allow for execution of network management functions, resetting end stations in the network, issuing commands to perform diagnostic functions, and providing specialized boot messages bypassing password protection, or bypassing other intermediate processes. In a preferred system, the network management station 21 and secure Wake On LAN network interface cards 13, 14, 15 implement an extended "Magic Packet"

protocol, such as that referred to above in connection with the "Magic Packet Technology White Paper" issued by Advanced Micro Devices, Inc.

Figure 2:
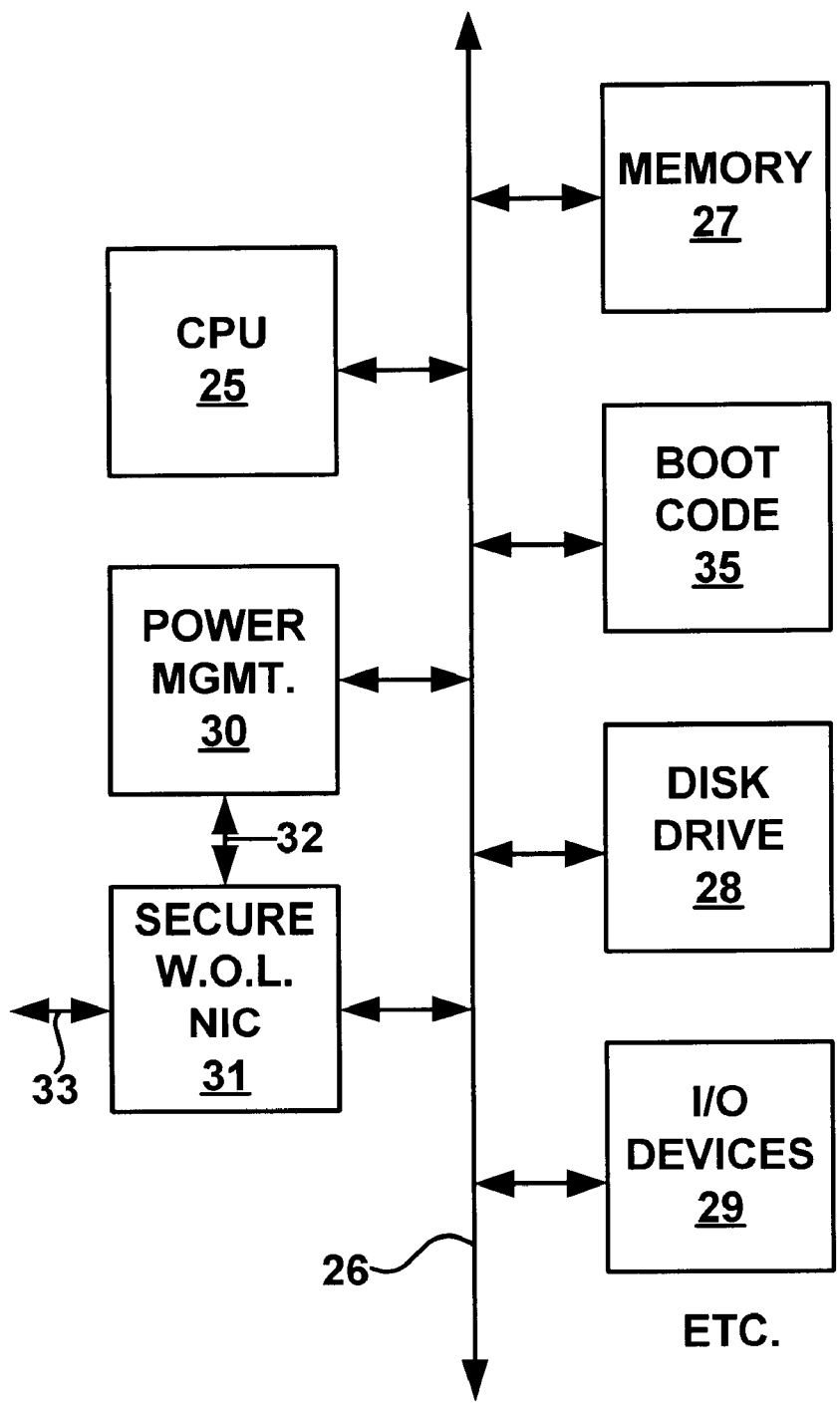
FIG. 2 is a simplified diagram of an end station including Wake On LAN and security logic according to the present invention.

FIG. 2 provides a simplified illustration of an end station, such as the end station 10 in the system of FIG. 1. The end station shown in FIG. 2 includes a central processing unit 25, which is coupled to a system bus 26. The bus Fit interconnects system memory 27, a disk drive 28 or other large scale non-volatile memory, various input/output devices 29, such as keyboards, displays, scanners, or other peripherals known in the art. Also, the system includes power management circuitry 30. The power management circuitry in this example is coupled to the system bus 26, but may be interconnected with devices in the system in a variety of fashions.

The system in FIG. 2 also includes a network interface card 31 which implements a secure Wake On LAN feature of the present invention. The network interface card 31 is coupled to the system bus 26, as well as to the power management circuitry 30 as indicated by line 32. The network interface card 31 is coupled to a LAN network medium 33 for communication with a remote management station through the network. The power management circuitry 30 represents a variety of available power management technology, which may be implemented in a so called green personal computer. Green personal computers include a power management circuit 30 that allows for a personal computer to go completely asleep, that is without power to the CPU, or to go to various levels of reduced functionality and power consumption depending on the particular environment of the device. The secure Wake On LAN network interface card 31 allows the system to receive Wake On LAN packets across the medium 33, and in response to issue signals to the power management circuitry 30, which results in waking up the CPU, or otherwise bringing up the system to allow functions specified by the network management system to be performed. Thus, an information system department using the management station is able to do end node management, such as software updates, backups of data, and other system wide services in the network, even in the presence of sleeping green PCs.

FIG. 2 also illustrates boot code memory 35 which is coupled to the system bus 26. The power management circuitry 30, in combination with the secure Wake On LAN network interface card 31 in one embodiment are coupled with the boot code 35. Thus, one command issued to the power management circuitry involves activating the boot code 35, while bypassing certain functions within the boot code such as password protection schemes which are incorporated into or initiated by, the boot code stored in the memory 35.

In other embodiments, the CPU 25 includes a reset function. The power management logic 30, in combination with the secure Wake On LAN interface card 31 in this embodiment may issue a system reset command. Also, other diagnostic processes are incorporated in the system of FIG. 2 related to power management which could be signaled using a secure Wake On LAN function of the present invention.

The diagram of FIG. 2 is a simplified diagram meant to represent any one of a variety of personal computer or work station architectures, such as Intel X86 based computers, Apple Macintosh computers, Sun Microsystems Workstations, or any other computer system.

Figure 3:
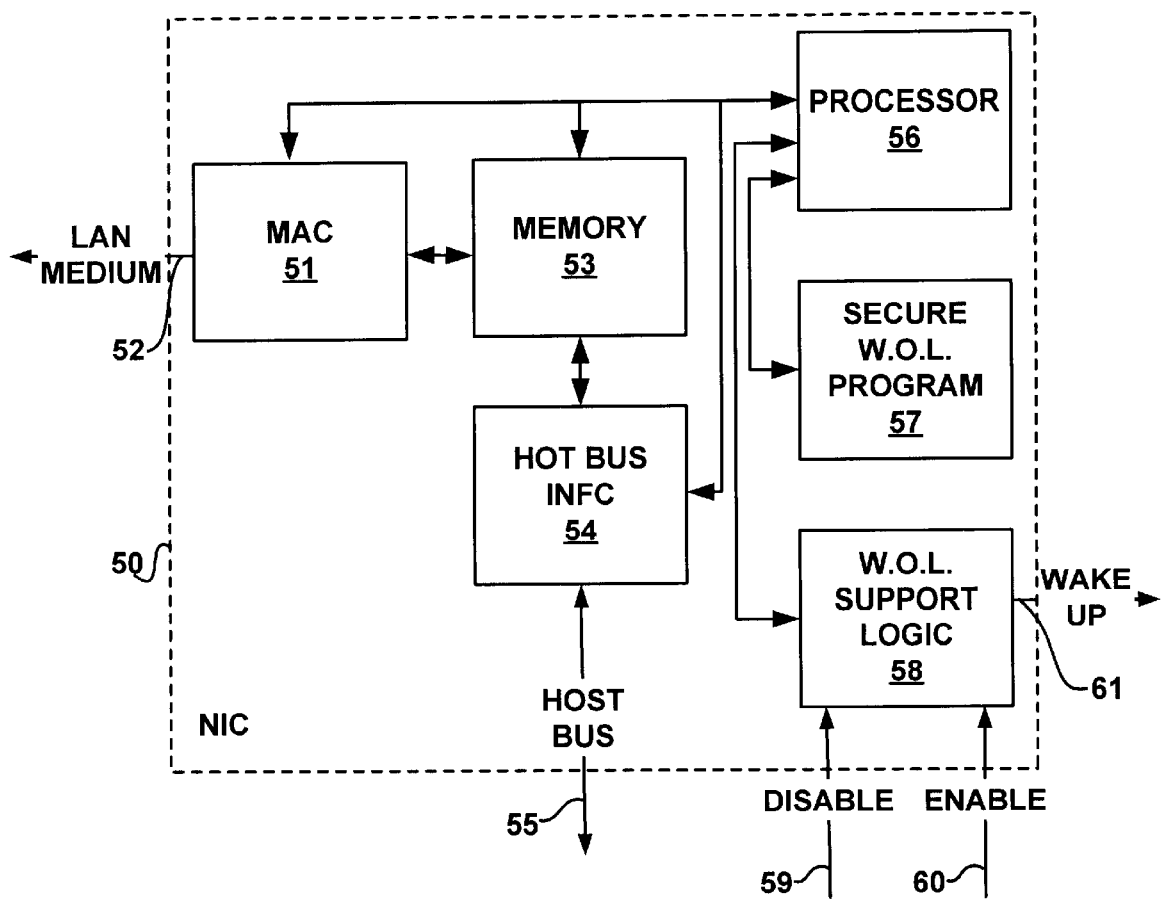
FIG. 3 provides a diagram of a network interface chip supporting secure Wake On LAN according to the present invention.

FIG. 3 illustrates a network interface chip including logic supporting the secure Wake On LAN feature of the present invention. Thus, the integrated circuit chip 50 of FIG. 3 includes a medium access control MAC unit 51 which has an interface to a local area network medium 52. The MAC unit 51 is coupled to memory 53. The memory 53 is coupled to a host bus interface 54, which includes an interface 55 to a host bus. A processor 56 is coupled to the MAC unit 51, the memory 53, and the host bus interface 54, and manages the transfer of network packets from the LAN medium to the host bus, and vice versa. The processor 56 in various embodiments consists of dedicated logic, a program controlled processor, or combinations of dedicated logic and a program controlled processor. Also implemented on the chip 50 are a secure Wake On LAN program 57, and Wake On LAN support logic 58. Wake On LAN support logic 58 includes a disable input 59 by which the host system is able to turn off the Wake On LAN function, and an enable input 60 by which the host system is able to turn on the Wake On LAN function. The Wake On LAN program 57 is implemented in a system in which the processor 56 is program controlled, via a software routine stored on the chip in read only memory, or non-volatile memory, which would allow for updates to the program.

Wake On LAN support logic 58 also provides for generating a wake-up command on line 61. The wake-up command on line 61 is X bits wide in various embodiments, where X varies from 1 up to any number of bits required to support a variety of system and power management commands which might be carried in a Wake On LAN packet according to the present invention. Thus, a two bit wake-up command is capable of signaling four different processes in a single clock cycle. A one bit wake-up command line 61 is capable also of signaling a variety of processes using a serial communication protocol.

The Wake On LAN support logic 58 in various alternatives is implemented using dedicated logic on the chip 50, or as part of a program executed by the processor 56, or as combinations of dedicated logic and software executed by the processor 56.

The memory 53 is implemented using random access memory, or first in/first out FIFO memory, or any other of a variety of approaches depending on the particular implementation of the device. As mentioned above, one embodiment of the present invention provides an extension of the "Magic Packet" technology currently in use. Thus, the Wake On LAN is a feature of network adapter cards that allows network administrators to remotely boot powered off end systems.

One concern that this feature creates is the potential for intruders acting remotely to power up unattended systems and attempt to penetrate them. This danger is more acute than that for already powered up systems because their powered down state demonstrates they are not being monitored for intrusion activity. This invention describes a protocol for securing Wake On LAN. The protocol in a preferred system is based on an extension of the existing Wake On LAN protocol, providing it protection from abuse.

Figure 4:
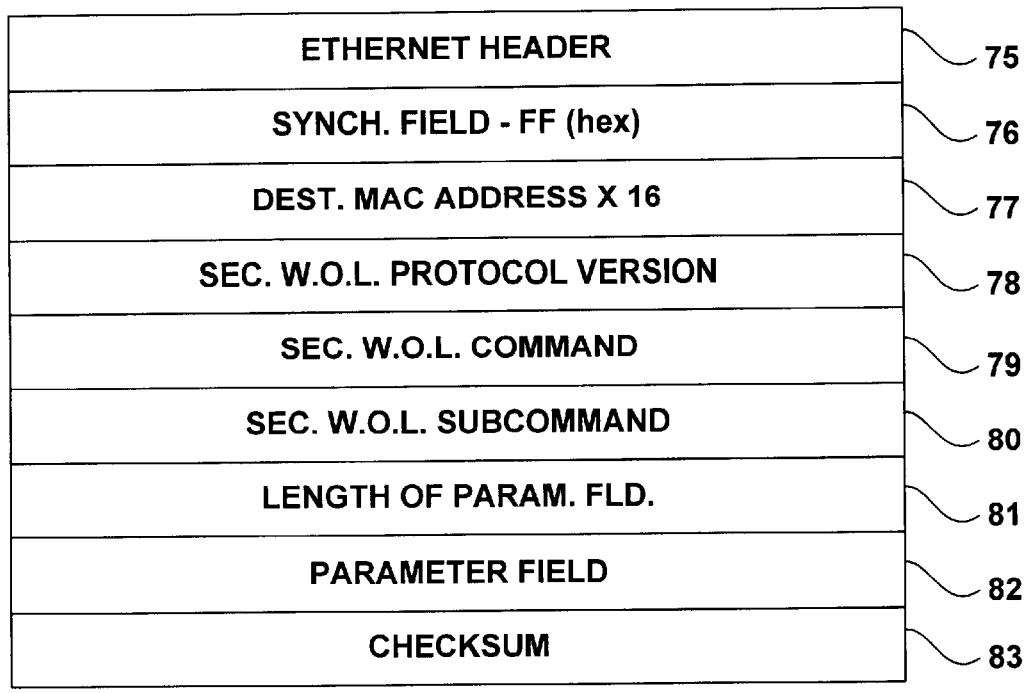
FIG. 4 illustrates a packet format for an extended "Magic Packet" Wake On LAN protocol according to the present invention.

One embodiment of the invention utilizes a byte sequence illustrated in FIG. 4 (which may be located anywhere within a packet) with the following format following an Ethernet header 75:

| Length (bits) | Value | Field Description |
|---|---|---|
| 6 × 8 | FF (hex) | Synch Field (76) |
| 16 × 6 × 8 | Destination MAC Address Repeated 16 times | End System Selector (77) |
| 16 | Version | Protocol version number (78) |
| 16 | Command | Wake On LAN security protocol command (79) |
| 16 | Subcommand | Wake On LAN security protocol subcommand (80) |
| 16 | Length (L) | Length of parameter field (81) |
| L × 8 | Parameters | Value of the parameters associated with the Command/Subcommand (82) |
| 32 | Checksum | Checksum of the Prefix, Selector, Version, Command, Subcommand, Length and Parameters fields (83) |

Parameters are encoded in the Parameters field as needed for an individual command using a type, length, value format.

In alternatives, the destination address in field 77 is not repeated in the manner of a "Magic Packet". In these alternatives, higher layer protocol techniques, such as a User Datagram Protocol UDP or Transport Control Protocol TCP recognized by a processor on the adapter, are used for identifying the packet as a Wake On LAN message.

Figure 5:
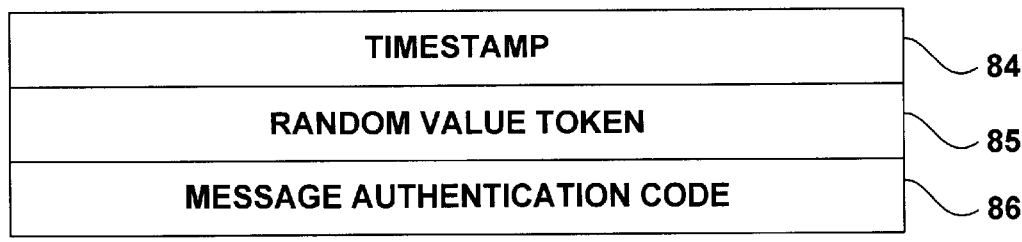
FIG. 5 illustrates the parameter field for a boot command in the packet format for FIG. 4.

This general packet format has the potential to carry multiple kinds of Wake On LAN commands, although in one embodiment it is restricted to only a single command. In this embodiment, the command of interest is "Boot", which has the following Command, Subcommand, Length and Parameters (FIG. 5) values:

Command 1

Subcommand=0

Parameters=[Timestamp 84, Random Value Token 85, Message Authentication Code 86], where Timestamp= 32 bit value indicating time for example in seconds since 00:00:00 UTC, Jan. 1, 1970, Random Value Token=16-bit random number, and Message Authentication Code=160-bit HMAC-SHA-1 over the message including the parameters field.

The system uses this message in the following way. When a system is powered down, but its NIC is capable of receiving a Wake On LAN message, the network management station sends it the above defined boot message. The NIC acts according to the Wake On LAN protocol, by looking for the 6 FF hex valued bytes at the beginning of the packet, then the destination MAC address repeated 16 times, or by looking for a UDP or TCP packet addressed to the process on the adapter. The adapter may generate a response to the message, such as an acknowledgment UDP packet, if desired.

The NIC recognizes the boot command and subcommand and then extracts the timestamp, random number and Message Authentication Code from the parameters field. The HMAC-SHA-1 computation is driven by a secret key shared by the end system NIC and the management station. One keyed hashing for message authentication approach is described in RFC2104 entitled HMAC: KEYED-HASHING FOR MESSAGE AUTHENTICATION, Krawczyk, et al., February 1997. See FIPS PUB 180-1 "Secure Hash Standard", Apr. 17, 1985 issued by the U.S. Department of Commerce Technology Administration, National Institute of Standards and Technology. Other message authentication hash functions could be utilized as well, such as the "MD5 Message-Digest Algorithm", RFC1321, Rivest, April 1992 or DES-MAC, also called DAA, [FIPS-113]. The message authentication code can be implemented using any of a variety of cryptographic hash functions, not limited to the SHA-1 and MD5 computations mentioned above. The secret may be manually distributed to both the end system NIC and the management station, or distributed using other secure protocols.

Other key distribution techniques are used in various embodiments of the message authentication code, including but not limited to public key encryption, and key distribution center schemes.

The end system checks the Message Authentication Code to see if it is correct. If it is, then a replay prevention test is made. If the Message Authentication Code is incorrect, the boot message is ignored.

One approach to replay detection includes a timestamp test and a random number test. The timestamp field carries the time when the management system sent the Wake On LAN message. The end system checks the timestamp to determine whether it is within a prespecified time window D seconds in width, i.e., current_time−0.5*D<=timestamp<= current_time+0.5*D. If not, the message is ignored. Checking the timestamp in this way allows random numbers (described below) to be discarded from the replay cache (described below) after D seconds, which allows the size of the cache to be kept small. To ensure the timer running on the NIC is in proper synchronization with the management machine sending the Wake On LAN message, it is loaded with the time-of-day value kept by the end system each time the end system is put to sleep. Synchronization between the end system and the management station is achieved through standard time synchronization protocols, such as the Network Time Protocol NTP, RFC 1305. If the timestamp test passes and the random number is not in the replay-detection cache described below, the NIC accepts the boot message and carries out the Wake On LAN wake up procedure. If the Message Authentication Code is correct, and the timestamp test passes, but the random number is in the replay-detection cache, the boot message is ignored, since it potentially represents a replay attempt. There is a very small probability that the same random number is drawn twice during an interval of time during which it is in the NICs replay-cache. However, if the random numbers are truly random, or are pseudo-random and managed properly, the probability this will happen on consecutive messages is vanishingly small and can be covered by sending the wake up packet more than once with different random numbers.

This approach based on storing random number token only is simple to implement, but has the following problem. If the size of the cache is N, and N+1 valid packets are sent by the network management system during an interval of time less than or equal to D in length, then the least recent of these packets can be replayed, since its random number will have been pushed out of the cache by the most recent message. There are two other approaches that address this problem, each with their own advantages and disadvantages. In both approaches the Message Authentication Code must be valid in addition to the timestamp checks described. We use the following notation to describe these approaches:

clock=the value of the clock when an expression is evaluated.

The clock increments every second, for example.

lowerbound=a value used in determining the acceptability of a packet (see below).

candidate=the packet being considered for acceptance.

timestamp(candidate)=the timestamp value in the packet being considered for acceptance.

timestamp(i)=the timestamp value in the packet [e.g., timestamp(candidate)] that is associated with cache entry i.

entry(i)=the delta value in cache entry i.

In a first alternative approach it is assumed that the packets arrive in time order; that is, their timestamp values are monotonically increasing. This assumption is reasonable when there is only one management system managing a set of end systems. However, it is not reasonable when there is more than one management system managing this set, since the clocks of the various management systems are unlikely to be synchronized causing the timestamps from one to interleave the timestamps from the others. The acceptance criteria for this approach is very simple:

timestamp(candidate)>lowerbound, where lowerbound is set to the timestamp of the last accepted packet.

There is no need to ensure that clock−0.5*D<=timestamp<=clock+0.5*D, since old messages must have timestamps less than or equal to the last accepted packet.

In a second alternative approach, the cache entries store a value corresponding to the timestamp carried by the packet instead of, or in one embodiment, in addition to, the random number value. This value is the full timestamp or a delta between a base timestamp value stored along with the cache and the value carried by the packet that corresponds to the cache entry.

The acceptance criteria for a magic packet are:

timestamp(candidate)>=max(lowerbound, clock−0.5*D) AND timestamp(candidate)<clock+0.5*D.

In this approach the computation of lowerbound is different than that in the first approach. This is described below.

In addition to the two checks above, timestamp (candidate) must be compared to timestamp(i) for each entry in the cache, which means computing this value for each entry (see below). If timestamp(candidate) equals one of these values, the packet is rejected.

The cache is a linked list of entries, each pointing to the one immediately more recent. That is, the least recent cache entry, the one with the oldest (i.e., smallest) associated timestamp, is referenced by a pointer "base". The entry associated with the next oldest (smallest) timestamp in the cache is referenced by the entry referenced by "base". Proceeding iteratively, the entry in the cache associated with the ith oldest timestamp is referenced by the entry associated with the (i−1)st oldest timestamp.

Various cache implementation strategies are possible, one being to store cache entries in a linear table and associate a k-bit index with each, where there are $(2^k)-1=n$ entries in the cache. Call the index for the ith entry in the cache index(i). In other words, the cache looks something like:

TABLE

| position | index | entry |
|---|---|---|
| 0 | index (0) | entry (0) |
| 1 | index (1) | entry (1) |
| 2 | index (2) | entry (2) |
| . | | |
| . | | |
| . | | |
| n−1 | index (n−1) | entry (n−1) |

Each index(i) contains a table position value referencing the entry with the next oldest timestamp. The value n is used to mark the end of the linked list. In subsequent exposition, the first linked list entry is the oldest (i.e., its associated timestamp is smallest) and is the one referenced by 'base', which is also an k-bit variable. The last linked list entry is the youngest (i.e., its associated timestamp is largest) in the cache.

Other linked list implementation strategies are possible, for example, by having the last entry reference the first.

Once a packet is accepted, it is placed in the cache according to the value of its timestamp. This implies that an accepted packet may be placed in any linear position in the cache.

The value for entry(i) is the difference between timestamp (index(i)) and timestamp(i). Since the linked list keeps entries in timestamp order, timestamp(index(i))−timestamp (i) is always positive.

In order to reconstitute timestamp(i) from entry(i), the full timestamp value associated with timestamp(b), the entry referenced by "base", is retained in a variable "base_timestamp". Thus, entry(b)=0 and timestamp(b)=base_timestamp=entry(b), timestamp(i) is computed by walking through the linked list and adding entry(i) to base_timestamp for each linked list entry preceding and including i. When a new packet is accepted, it is placed in the cache, the appropriate delta value for it is computed and stored, and the value in "base-timestamp" adjusted so that entry(b)=0 and base_timestamp=timestamp(b).

The value of lowerbound is base_timestamp. By definition, it is less than timestamps associated with each entry in the linked list. Thus, the test:

timestamp(candidate)>max(lowerbound, clock−0.5*D)

ensures that the timestamp of the candidate is younger (that is, greater) than any timestamp that has been displaced from the cache.

When the cache is initialized or re-initialized:

base_timestamp=0 base=n entry(i) 0, i=0, n−1 index(i) n, i=0, n−1

Since there are no entries in the cache when the first acceptable packet arrives, the linked list will have less than n entries-until it is fully populated. A special rule must control what happens when base=n. Specifically, in this case base is not valid and index(i) for all entries i are initialized to n. When the first acceptable packet arrives:

entry(0)=0 index(0)=n base_timestamp=timestamp(candidate)

base=0

It is possible that when an acceptable packet arrives, base_timestamp is less than clock−0.5*D. In that case, after the candidate is judged acceptable, the linked list is searched starting from the entry referenced by base and entries are removed from the linked list for which their associated timestamp is less than clock−0.5*D. This is done by iteratively executing the following statements:

```
loop until (base_timestamp >= clock − .5*D)
{
    base_timestamp = base_timestamp + entry(index(base))
    entry(index(base)) = 0
    base = index(base)
}
```

When this loop completes, base will reference the first entry i on the linked list for which timestamp(i)>=clock−0.5*D and base-timestamp will equal timestamp(i). (If all entries on the linked list have associated timestamps less the clock−0.5*D, the cache is reinitialized before the candidate is placed.) Note that at some later point in time when clock has increased, base_timestamp may no longer satisfy this inequality, which is why the first inequality in the test for candidate acceptability uses the maximum of base timestamp (=lowerbound) and clock−0.5*D.

If after ensuring base-timestamp>=clock−0.5*D there are n entries in the linked list, the oldest entry is removed by:

base=index(base)

The table slot that formerly held the oldest entry is then used to store the candidate, which is placed in the appropriate linked list position according to timestamp (candidate).

What is the range of values that entry(i) must represent? Recall that the acceptance criteria for a packet is:

$$\text{timestamp(candidate)} >= \max(\text{lowerbound}, \text{clock}-0.5*D) \text{ or, since lowerbound} = \text{base\_timestamp}$$

$$\text{timestamp(candidate)} >= \max(\text{base\_timestamp}, \text{clock} -0.5*D) \quad (1)$$

AND $$\text{timestamp(candidate)} < \text{clock}+0.5*D \quad (2)$$

After the candidate is accepted, but before it is placed on the linked list, base_timestamp is adjusted so that:

$$\text{clock}-0.5*D <= \text{base\_timestamp} \quad (3)$$

There are two cases when the candidate is inserted into the linked list. In the first, the candidate is inserted as the oldest entry, in which case base_timestamp is set to timestamp (candidate) and base to the table position holding the candidate. In the second case, the candidate is inserted after the oldest entry. In both cases, following from (1) and (3), the following inequality holds after the insertion is made:

$$\text{clock}-0.5*D <= \text{base\_timestamp} <= \text{timestamp(candidate)} \quad (4)$$

Combining (2) and (4) yields:

$$\text{clock}-0.5*D <= \text{timestamp(candidate)} < \text{clock}+0.5*D \quad (5)$$

This implies that in the worst case (i.e., base_timestamp= clock −0.5*D), all entry(i) on the linked list between base and the one where candidate is inserted are equal to 0, and timestamp(candidate)+clock+0.5*D−1), the value inserted in the candidate entry is less than D. Therefore, the range of values that entry(i) must represent are 0...D−1. The interval length D that can be represented by 16 bits per cache entry is 65,536 seconds=18.2 hours.

Finally, if multiple management stations are sending packets to the same end system, there is the possibility that two packets will arrive with the same timestamp. Unless there is some way to disambiguate these, the first will be accepted and the second dropped. Two possible disambiguation strategies are:

In one alternative, the end system uses the random value in the packet to help reduce collisions. For example, it could store the random value or an h-bit hash of the value in the cache entry and compare it against the value or h-bit hash of the value in the candidate. However, storing these bits in a cache entry reduces the number of bits available for deltas (assuming you want to keep the total number of bits constant). Since 2^12 seconds is 4096 seconds=68 minutes and since validity intervals less than an hour become problematical, especially when multiple management stations are involved, either the entries must be increased to something larger than 16 bits or the disambiguation information will only have 4 bits of randomness. In the latter case, there may be an unacceptable number of legitimate packets dropped when there are a large number of management stations controlling the same end system.

In another alternative, the end system sends back a collision message when it finds a timestamp(i) in the cache that has the same value as timestamp(candidate). Also, it could send back an acknowledgment when a candidate is accepted. This should come after the message authentication code check to prevent an intruder from scanning through the cache trying to find values that are already there. There is no benefit for an intruder to capture valid packets and then replay them to see if their timestamps are in the cache, since if he can capture these packets he can just read their timestamps directly. If the intruder has not captured valid packets, he cannot get the end system to return collision or acknowledgment messages, since he cannot compute the necessary message authentication code. When a collision message is returned, the management station can try the same command with a different timestamp.

Figure 6:
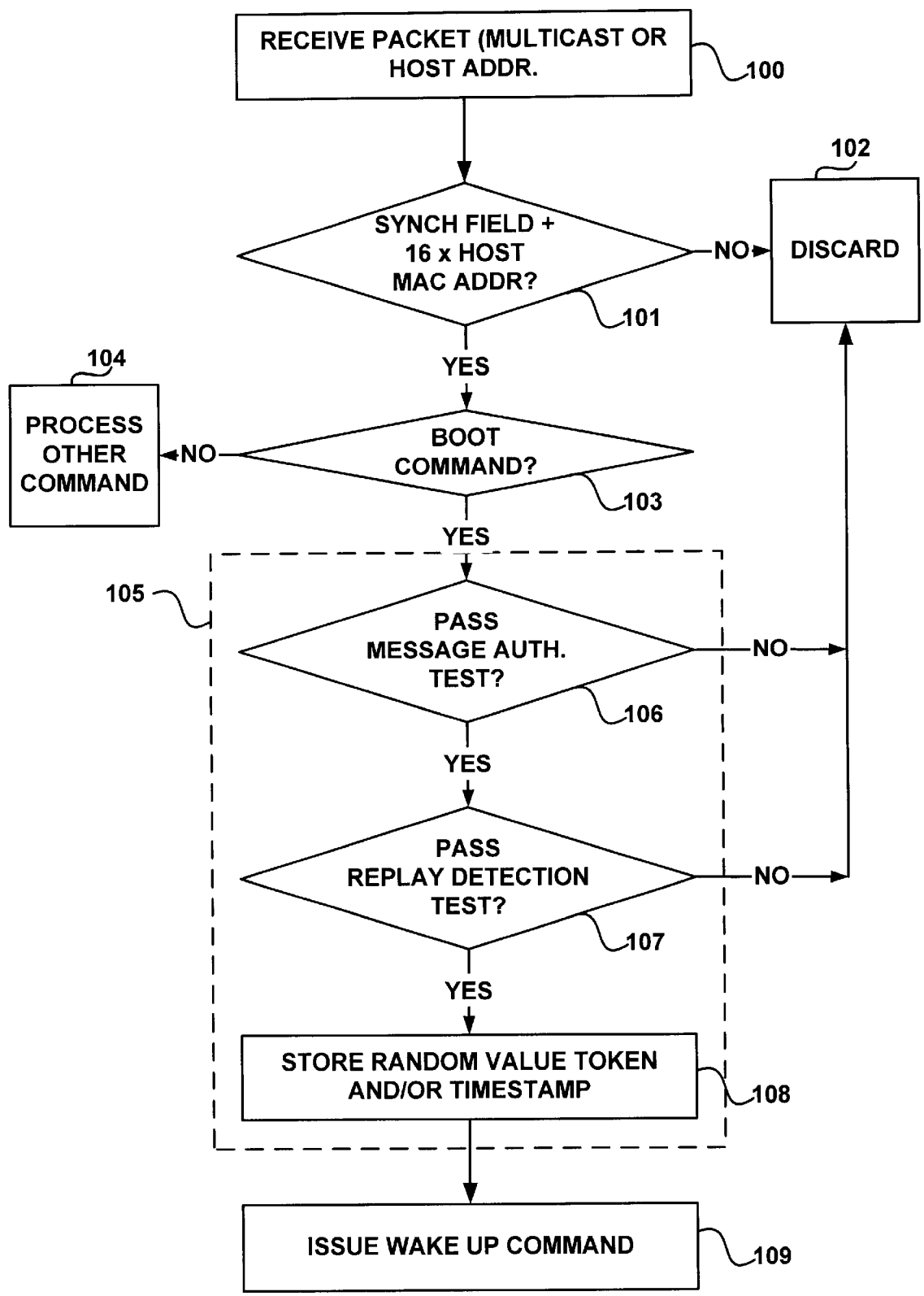
FIG. 6 provides a flow chart for the processes executed in the network interface card of the present invention.

FIG. 6 provides a simplified diagram of the process executed on the network interface card when the end station is in a reduced function state. Basically the management station establishes a protocol with the end station by which the management messages can be issued with authentication to the end station, such as the protocol specified with respect to FIGS. 4 and 5. The management message is produced at the network management station and transmitted to the end station. The end station perhaps after having synchronized clocks with the network management station as mentioned above receives the packet (block 100). The packet carries either a multicast address, or the MAC address of the network interface card for the host station. Following the "Magic Packet" protocol, the network interface card looks for the synchronization field followed by 16 copies of the host MAC address (step 101). If this field is not found, then the packet is discarded (block 102). As mentioned above, alternatives do not use the "Magic Packet" format, but instead use higher protocol layer identifiers processed by logic on the adapter to identify the packets. If after step 101, the packet was detected, then the algorithm determines whether a boot command is being received (step 103). If not, then the packet may carry another command, and such command is processed as indicated at block 104. If the boot command is received, then the process performs the security functions represented by block 105. The network interface card proceeds to verify the message authentication code (step 106). If the message authentication code is not verified, then the packet is discarded (block 102). If the message authentication code is verified, then the network interface card performs a replay detection test (block 107). If at step 107, the replay detection test is passed, then the random value token and/or timestamp, depending on the replay prevention process chosen, is stored in the cache (block 108). Then, the wake up command is issued (block 109).

The algorithm described in FIG. 6 is adapted for the boot command. Other commands relating to system and power management can also be implemented with security. The other commands may implement various types of this security depending on the particular process to be invoked using the Wake On LAN packet. In one approach, the security functions 105 are executed before the command type is determined, independent of the command type.

Accordingly, the present invention provides an extension of the Wake On LAN functionality. The extension allows for secure operation of the scheme, and incorporation into the scheme of a variety of commands in addition to the basic wake-up command. Overall, the usability and security available for centralized management of networks is increased.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An apparatus for signaling management circuits in a host computer in response to messages received through a network interface, the apparatus comprising:

detection logic coupled to the network interface to detect a received network packet, the network packet including a message from a source to the management circuits in the host computer, the message including a timestamp indicating a time at which the source produced the message; and security logic coupled to the network interface that is responsive to data in the packet, the security logic:

authenticates the source of the message;

verifies that the timestamp falls within a security window of time; and accepts the message and generates a signal to the management circuits in the host computer when the message passes authentication and the timestamp falls within the security window of time.

2. The apparatus of claim 1, wherein the detection logic detects the network packet while the host computer is in a reduced function state and wherein the security logic is further responsive to data in the packet to:

discard the message when the message fails authentication; and discard the message when the timestamp does not fall within the security window of time.

3. An apparatus for signaling management circuits in a host computer in response to messages received through a network interface, the apparatus comprising:

detection logic coupled to the network interface to detect a received network packet, the network packet including a message from a source to the management circuits in the host computer, the message including a message authentication code comprising a message digest; and security logic coupled to the network interface that is responsive to data in the packet, the security logic:

authenticates the source of the message;

verifies the message digest; and accepts the message and generates a signal to the management circuits in the host computer when the message passes authentication and when the message digest is verified.

4. The apparatus of claim 3, wherein:

the detection logic detects the network packet while the host computer is in a reduced function state; and wherein the security logic is further responsive to data in the packet to discard the message when the message fails authentication.

5. The apparatus of claim 4, wherein the message authentication code further comprises a secret value known to the source and to the security logic.

6. The apparatus of claim 4, wherein the message digest comprises a result of a hash function of the message.

7. The apparatus of claim 6, wherein the message authentication code further comprises a secret value known to the source and to the security logic.

8. An apparatus for signaling management circuits in a host computer in response to messages received through a network interface, the apparatus comprising:

detection logic coupled to the network interface to detect a received network packet, the network packet including a message from a source to the management circuits in the host computer, wherein the message includes a message authentication code and information to indicate re-use of the message; and security logic that is responsive to data in the packet, the security logic:

authenticates the source of the message;

accepts the message;

detects re-use of the message; and generates a signal to the management circuits in the host computer when the message passes authentication and has not been re-used.

9. The apparatus of claim 8, wherein the information to indicate re-use comprises a token, and wherein the security logic detects re-use by determining whether another message having the same token has been received.

10. The apparatus of claim 9, wherein the token comprises a random value and the apparatus includes memory to store random values from received messages; and wherein the security logic detects re-use by comparing the stored random values with the random value in a token of the received message.

11. The apparatus of claim 9, wherein:

the token comprises a timestamp and the apparatus includes memory to store timestamps of received messages; and wherein the security logic detects re-use by comparing the stored timestamps with the timestamp of the received message.

12. The apparatus of claim 9, wherein:

the token comprises a timestamp; and wherein the security logic detects re-use by ensuring that the timestamp in the received message is more recent than that in a most recently received message.

13. The apparatus of claim 9, wherein the token comprises a timestamp, and the apparatus includes memory to store timestamps of received messages; and wherein the security logic detects re-use by comparing the stored timestamps with the timestamp of the message being authenticated to verify that the timestamp of the message being authenticated is more recent than a baseline time, and does not match a timestamp of a received message in the memory.

14. The apparatus of claim 13, wherein the memory comprises a number of entries arranged as a linked list.

15. The apparatus of claim 13, wherein the memory comprises a first-in-first-out cache, and the baseline time is equal to a most recent of a current time as measured for the security logic and a time represented by an earliest timestamp in the memory.

16. An apparatus for signaling management circuits in a host computer in response to a message received through a network interface, the message including a message authentication code and a re-use token, the apparatus comprising:

logic coupled to the network interface to detect a received network packet carrying the message from a source to the management circuits in the host computer, the logic being operable while the host computer is in a reduced function state, the logic including security logic that:

authenticates the source of the message in response to data in the packet;

detects re-use of the message in response to the re-use token; and accepts the message and generate a signal to the management circuit in the host computer when the message passes authentication and has not been re-used;

wherein the re-use token comprises a timestamp and a random or pseudo-random value;

wherein the apparatus includes a memory to store tokens of received messages, and wherein the security logic detects re-use by comparing stored timestamps with the timestamp of the message being authenticated to verify that the timestamp of the message being authenticated is more recent than a baseline time, and does not match both a timestamp and random or pseudo-random value in the memory.

17. The apparatus of claim 16, wherein the memory comprises a number of entries arranged as a linked list.

18. The apparatus of claim 16, wherein the memory comprises a first-in-first-out cache, and wherein the baseline time is equal to a most recent of a current time as measured for the security logic and a time represented by an earliest timestamp in the memory.

19. The apparatus of claim 16, wherein the management circuits boot the host computer in response to the signal.

20. The apparatus of claim 16, wherein the management circuits wake the host computer from a sleep state in response to the signal.

21. The apparatus of claim 16, wherein the message comprises a command indicating a process to be executed by the host computer after one of booting and waking up from a sleep state.

22. The apparatus of claim 16, wherein the message comprises one of a set of messages concerning power management, the set of messages including at least one member for signaling the management circuits to boot the host computer, and at least one member for signaling the management circuits to wake the host computer from a sleep state.

23. A method for signaling management circuits in an end station from a management station via a network, the method comprising:

transmitting a management message to the end station, the management message including a message authentication code and a timestamp;

verifying the authentication code;

verifying the timestamp; and generating a signal to the management circuits in the end station when both the authentication code and the timestamp are verified.

24. The method of claim 23, wherein verifying the timestamp comprises ensuring that the timestamp is more recent than a timestamp in a most recently received message.

25. The method of claim 23, wherein verifying the timestamp comprises ensuring the timestamp does not match a timestamp of a previously received message.

26. The method of claim 23, further comprising:

storing timestamps of received messages; and comparing stored timestamps with the timestamp of the message being authenticated to verify that the timestamp of the message being authenticated is more recent than a baseline time and does not match a timestamp of a received message in the memory.

27. The method of claim 26, further including storing the timestamps as a number of entries arranged as a linked list.

28. The method of claim 26, further including storing the timestamps in a first-in-first-out cache, and wherein the baseline time is equal to a most recent of a current time as measured for the security logic and a time represented by an earliest timestamp in the memory.

29. The method of claim 23, wherein the authentication code comprises a result of a hash function.

30. The method of claim 29, wherein the hash function is a hash function over the message and a secret value known to the source and to the end station.

31. The method of claim 23, wherein the message includes a token used to prevent re-use of the message.

32. The method of claim 31, wherein the token comprises a random value.

33. The method of claim 23, wherein the signal causes the management circuits to bypass a password protection process in a boot sequence in the end station.

34. The method of claim 23, wherein the signal causes the management circuits to initiate a diagnostic function in the end station.

35. The method of claim 23, wherein the signal causes the management circuits to power down the end station.

36. The method of claim 23, further comprising using the signal to wake the end station from a sleep state.

37. The method of claim 23, further comprising using the signal to boot the end station.

38. A method for signaling management circuits in an end station, the method comprising:

receiving a management message at the end station, the management message including a message authentication code, the message authentication code comprising a message digest;

verifying the authentication code;

verifying the message digest; and generating a signal to the management circuits in the end station when both the authentication code and the message digest are verified.

39. The method of claim 38, wherein the message authentication code further comprises a secret value known to the source and to the end station.

40. The method of claim 38, wherein the message digest comprises a result of a hash function of the message.

41. The method of claim 40, wherein the message authentication code further comprises a secret value known to the source and to the end station.

42. The method of claim 41, wherein the hash function is a hash function over the message and the secret value known to the source and to the security logic.

43. The method of claim 38, wherein the message includes a token used to prevent re-use of the message.

44. The method of claim 43, wherein the token comprises a random value.

45. The method of claim 43, wherein the token comprises a pseudo-random value.

46. The method of claim 38, further comprising using the signal to wake the end station from a sleep state.

47. The method of claim 38, further comprising using the signal to boot the end station.

* * * * *